United States Patent [19]

Masnik

[11] 4,123,941
[45] Nov. 7, 1978

[54] RAM PUMP FLOWMETER

[76] Inventor: Walter Masnik, 9 Pembroke Dr., Mendham, N.J. 07945

[21] Appl. No.: 778,930

[22] Filed: Mar. 18, 1977

[51] Int. Cl.² .............................................. G01F 1/34
[52] U.S. Cl. ................................. 73/205 D; 415/206; 415/213 R
[58] Field of Search ...................... 73/194 M, 205 D; 415/206, 213 R; 418/188

[56] References Cited

U.S. PATENT DOCUMENTS

| 839,312 | 12/1906 | Neumann .................. 415/213 R X |
| 3,232,105 | 2/1966 | Fishman et al. ................ 73/205 D |
| 3,838,927 | 6/1958 | Gray ............................. 73/205 D X |

*Primary Examiner*—James J. Gill
*Attorney, Agent, or Firm*—H. Hume Mathews

[57] ABSTRACT

A mass-rate flowmeter of the recirculation type wherein the recirculating flow is created by a ram type centrifugal pump having a substantially constant volume flow discharge rate over the operating pressure range of said mass-rate flowmeter.

6 Claims, 11 Drawing Figures

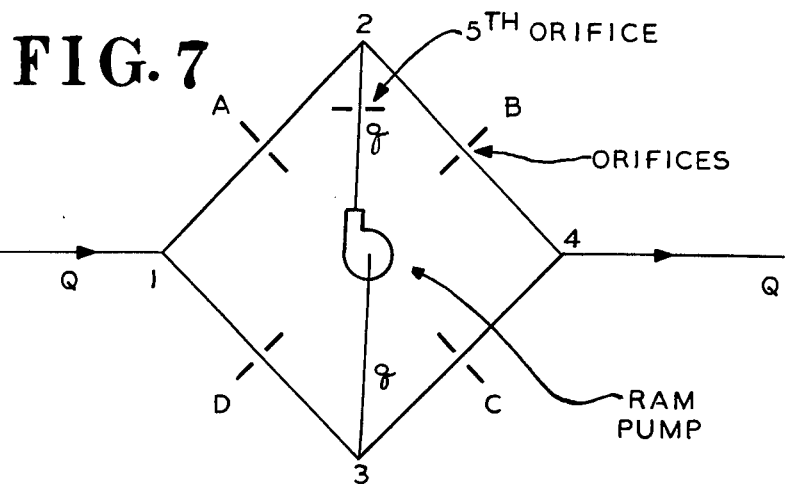
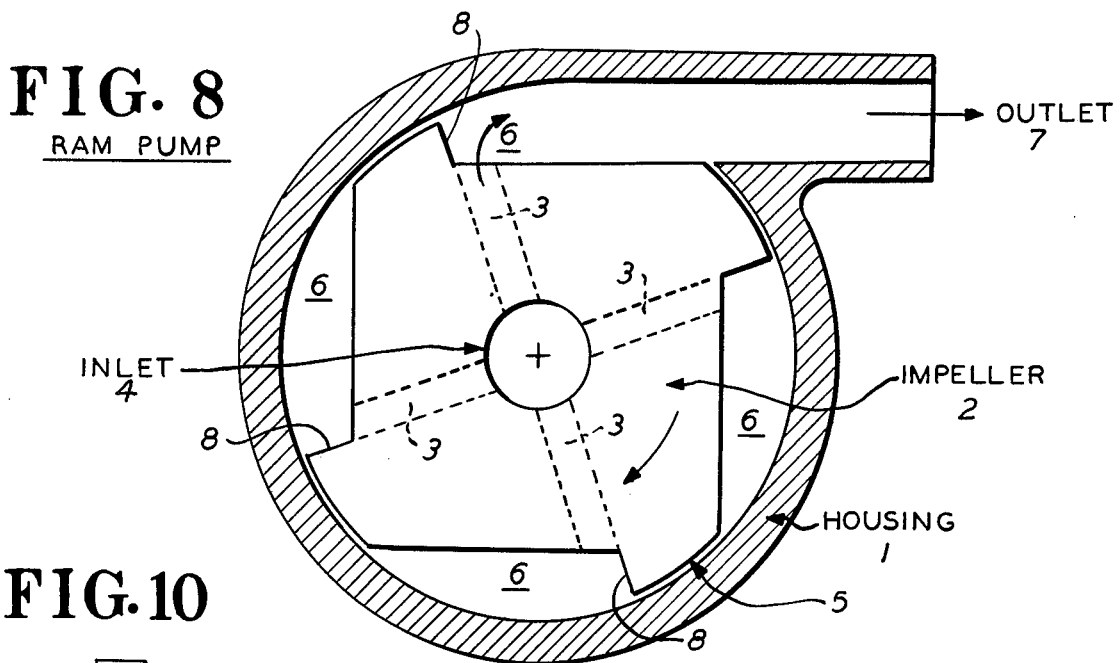
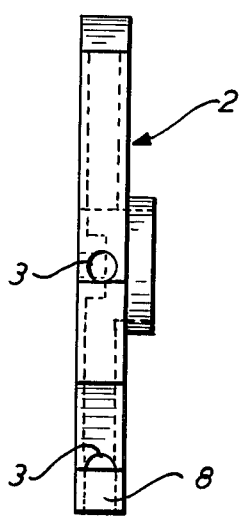
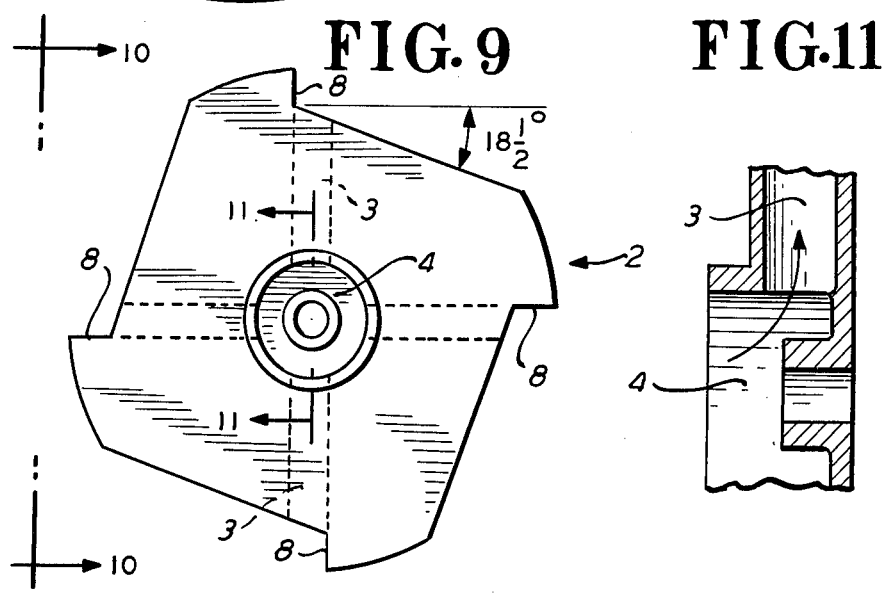

RAM PUMP FLOWMETER

BACKGROUND OF THE INVENTION

Mass-rate liquid flow meters of the recirculation type are disclosed in U.S. Pat. Nos. 3,232,104; 3,232,105; and 3,662,599. In these patents a gear pump is used to recirculate a constant volume flow $q$. Use of a gear pump is satisfactory for liquids having some lubricating quality, sufficient to keep the gears of the pump from wearing. However, in many applications the liquids being measured have either no lubricity or are chemically corrosive or both. A typical liquid without lubricity is water. Water has a corrosive effect on plain steel gears. Other liquids that have a much more corrosive effect are the many acids and bases that are used in the petrochemical industry. If one were to use a steel gear pump for such liquids, corrosion and wear of the gears would result. This would increase the leakage across the gears and hence change the value of $q$. One could use gears made out of stainless steel. However, stainless gears present the problem of galling, i.e., the tendency of the gear surfaces to stick or bind when they contact during pump operation. Centrifugal pumps, which have no rubbing surfaces exposed to the liquid flowing through the pump, have previously been considered unsuitable for use in mass-rate flowmeters because the pumping capacity of centrifugal pumps changes considerably with changes in the pressure differential across the pump.

Thus, a centrifugal pump does not have a constant volumetric flow when its pressure rise is varied. Further, centrifugal pump characteristics change with the viscosity of the liquid. Therefore, centrifugal type pumps have not, prior to the present invention, been used for creating the recirculating flow in mass-rate liquid flowmeters such as disclosed in the prior art patents identified above.

SUMMARY OF THE INVENTION

According to the present invention, a new mass-rate flowmeter is provided which obviates the above mentioned problems encountered with a gear pump and which enables the advantages of a centrifugal type pump to be obtained. The centrifugal pump, as pointed out above, can be made of materials that will withstand corrosion, including corrosion by chemicals such as acids, bases and other corrosive liquids. Because centrifugal pumps have rotating impellers with no rubbing parts as in the gear pump, there is no concern for wear.

The present invention also involves the provision of a new centrifugal pump, herein referred to as a "ram" pump. This new pump is characterized by the ability to operate, in the lower $\Delta P$ range (the lower range of pressure differentials between the pump inlet and the pump outlet), with pumping characteristics that are substantially the same as those of the previously used gear pumps.

There is another problem associated with the use of a centrifugal pump in mass-rate flowmeters as disclosed in the above identified prior art patents. With centrifugal pumps, there are variations in output flow rate with changes in viscosity of the liquid being pumped. According to the present invention, this problem also can be solved. For example, a fifth restrictor may be provided at the outlet of the ram pump, having flow characteristics which compensate for the pump output variations resulting from viscosity changes. An alternate method is by designing the four restrictors in the branch conduits to provide such compensation.

BRIEF DESCRIPTION OF THE DRAWINGS

FIG. 7 is a schematic diagram of the ram pump mass-rate flowmeter system of the present invention, showing the location of the ram pump and the fifth restrictor relative to the branch conduits.

FIG. 8 is a sectional view of the new ram pump of the present invention with the ram impeller in the pump housing.

FIG. 9 is an elevational view of the impeller shown in FIG. 8.

FIG. 10 is an elevational view of the impeller along the line 10—10 of FIG. 9.

FIG. 11 is a cross-sectional view, along the line 11—11, of the middle portion of the impeller shown in FIG. 9.

DETAILED DESCRIPTION OF A PREFERRED EMBODIMENT OF THE INVENTION

Consider the flow equation of a Flo-Tron meter, such as disclosed in U.S. Pat. Nos. 3,232,104; 3,232,105; and 3,662,599, and for the case shown in FIG. 3:

$$\Delta P_{1-4} = q \, k \, W / C^2 A^2 \qquad (1)$$

where
 $q \, k / C^2 A^2$ is normally a constant and:
 $\Delta P_{1-4}$ = differential pressure output signal
 $q$ = volumetric recirculating flow
 $W$ = measured mass flow passing through the meter
 $C^2$ = orifice coefficient of meter
 $A^2$ = area of orifice
 $k$ = constant From this equation it can be seen that if recirculating flow $q$ were to vary then $\Delta P_{1-4}$ would vary not only with mass flow rate W, but also with recirculating flow $q$.

Figure 1:
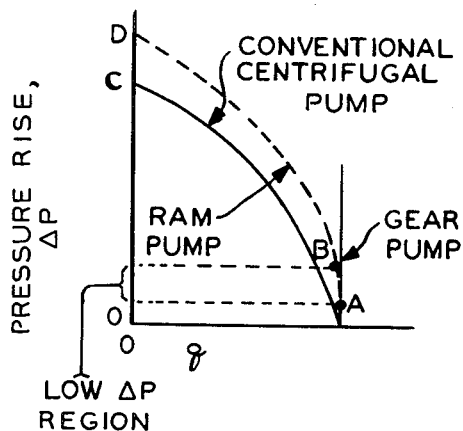
FIG. 1 is a graph showing the relationship between flow rate and pressure rise of the ram pump of the present invention as compared to the prior art centrifugal pumps and gear pumps.

A centrifugal pump does not have a constant volumetric flow when its pressure rise is varied. FIG. 1 shows the variation of flow rate $q$ versus pressure rise $\Delta P$ for a gear pump, a conventional centrifugal pump and the novel centrifugal pump of the present invention, herein referred to as a ram pump. The gear pump is a positive displacement pump and, therefore, meets the requirements of delivering a constant volume flow, regardless of pressure rise. On the other hand, a conventional centrifugal pump has a changing (decreasing) flow with increasing pressure rise across the pump.

It will be seen that the ram pump of the present invention, when operating in the region of low ΔP as shown in FIG. 1, very closely approximates the constant volume flow characteristics of the gear pump. This low ΔP region is the selected region in which the ram pump operates in the mass-rate flowmeter of the present invention.

The construction of the ram pump of the present invention is shown in FIGS. 8, 9, 10 and 11. It comprises a housing 1 enclosing the impeller 2. The impeller is a solid disc having a multiplicity of flow passages 3, respectively connecting the impeller inlet 4 to a multiplicity of cavities 6 spaced around the periphery 5 of the impeller.

When the impeller rotates a pressure determined by the centrifugal force on the liquid in passage 3 is generated in transversely extending discharge cavities 6, formed by scalloped portions in the periphery of the impeller. The impeller has a close fit between its periphery 5 and the housing 6 to prevent leakage and dissipation of the pressure of trapped liquid in the cavities 6.

Rotation of the impeller causes liquid entering the inlet 4 to flow radially outward through the passages 3 and into the transversely or tangentially extending cavities 6. These cavities are thus filled, as the impeller rotates, and when each cavity, in turn, arrives at the rotational position wherein it connects with the outlet 7, as shown in FIG. 8, the liquid in that cavity is positively displaced through the pump outlet port 7 by the piston-like effect of the impeller face 8 forming the rear wall of the cavity.

Thus, although the pump is a centrifugal pump in that centrifugal force causes the outward flow of liquid through passages 3, and thereby pressurizes the liquid in the cavities 6, it additionally creates a "ram" pressure by the piston-like effect created by the movement of cavity 6, and its rear wall 8, past the discharge port 7 of the pump housing. The resultant pressure head in the outlet 7 is herein referred to as the ram pressure.

Referring to FIG. 1, the ram pressure created by the novel pump of this invention will be seen to be substantially the same in constant flow characteristics as that of the conventional gear pump in the lower range of pressure rise across the pump. Because the ram pump pressure rise curve is very steep between points A and B of the region in which the ram pump would be operating in the mass-rate flowmeter of the present invention, it can successfully be utilized in the mass-rate flowmeter of the present invention.

Figure 5:
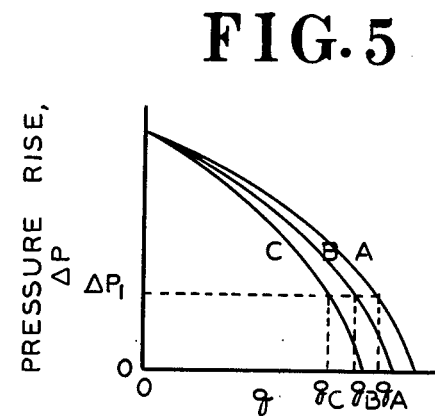
FIG. 5 is a graph of the relationship between the pressure rise $\Delta P$ and the flow rates $q$, for a centrifugal pump (including the ram pump of the present invention), for liquids having different viscosities.

Centrifugal pump characteristics change with the viscosity of the liquid being pumped. This is also true, to some extent, of the ram pump. This is shown in FIG. 5, where the curves A, B, C are for liquids of different viscosities with C being the highest viscosity liquid. As shown on the curves, for a constant pressure rise $\Delta P_1$ different $q$'s result with different viscosities — that is, the recirculating flow $q$ decreases with increasing viscosity. This decrease in $q$, however, can be offset by having orifices in the meter bridge with a decreasing coefficient.

Figure 6:
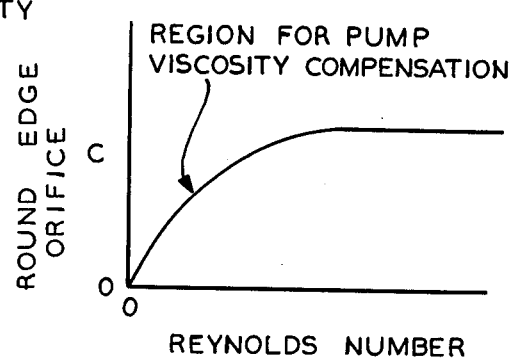
FIG. 6 is a graph of the relationship between orifice coefficient C and the Reynolds number for a round edge orifice.

Referring to Equation 1, if $q$ and $C^2$ both change in the same proportion then their ratio $q/C^2$ remains a constant. Round edge orifices have such a characteristic as shown in FIG. 6. One can see that the orifice flow coefficient decreases with decreasing Reynolds number. Reynolds number, which relates liquid viscosity to liquid flow, is a dimensionless parameter whose equation is:

Reynolds No. $= sVD/u$ where
 $s$ = liquid density
 $V$ = liquid velocity
 $D$ = diameter of flow opening
 $u$ = viscosity Thus, for increasing viscosity the Reynolds number decreases and, as shown in FIG. 6, this increasing viscosity brings about a decrease in the flow coefficient C. Therefore, by suitably matching the rounded orifice coefficients with the pump characteristics, a mass flow meter can be provided capable of operating over a very wide viscosity range with the output signal linear and proportional to mass flow.

Figure 2:
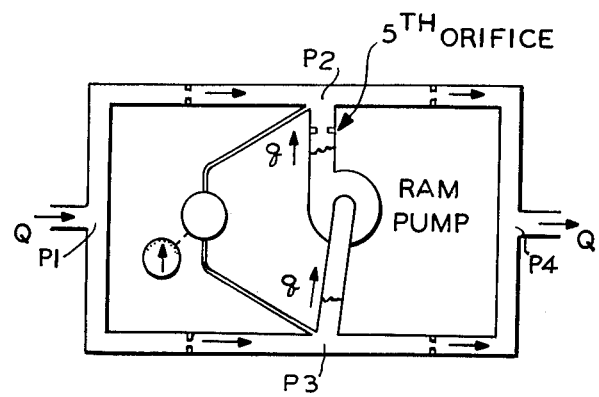
FIG. 2 is a schematic flow diagram of the ram pump mass-rate flowmeter system of the present invention, wherein the constant volumetric recirculating flow $q$ is less than the input volumetric flow Q.
Figure 3:
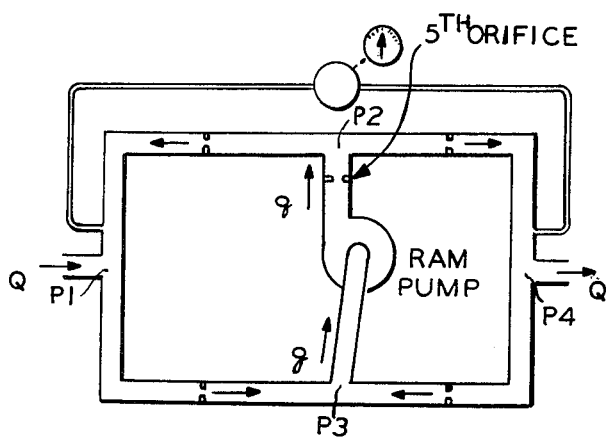
FIG. 3 is a schematic diagram of the ram pump mass-rate flowmeter system of the present invention wherein the constant volumetric recirculating flow $q$ is greater than the input volumetric flow Q.

Another approach for compensating the decreasing pump flow with increasing liquid viscosity is to place a fifth orifice in the flow line connecting the discharge port of the pump to a branch conduit at a point intermediate the restrictors in the branch conduit, as shown in FIGS. 2, 3 and 7. The fifth orifice is designed to have a flow coefficient that will increase with increasing viscosity of the liquid.

Figure 4:
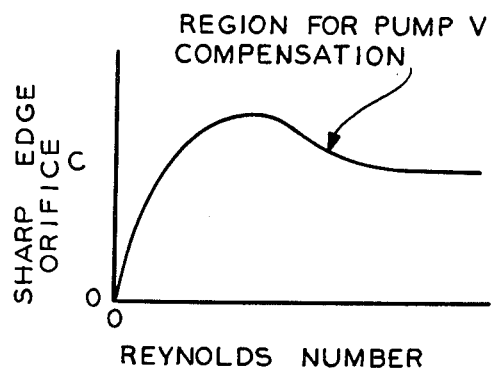
FIG. 4 is a graph of the relationship between orifice coefficient C for a sharp edge orifice and the Reynolds number.

An increasing flow coefficient means there is less resistance to flow with increasing viscosity. Therefore, by proper matching of the flow coefficient of the fifth orifice with the ram pump characteristic it is possible to maintain a constant recirculating flow through the flowmeter regardless of viscosity variation of the liquid. FIG. 4 illustrates a sharp edge orifice flow coefficient that can be used for pump viscosity compensation.

The flow equation for an orifice is $$q = CA \sqrt{\Delta P/s}$$

where
 $q$ = volume flow
 $C$ = orifice flow coefficient
 $A$ = orifice area
 $\Delta P$ = pressure drop across the orifice
 $s$ = liquid density From this equation one can readily see that raising or lowering the value of C will raise or lower the value of $q$ for a given $\Delta P$.

When referring to "sharp edge" or "rounded edge" orifices, the edges referred to are those on the side of the orifice from where the liquid flows into the orifice.

The viscosity compensation techniques just described are for the case of the pump having decreasing flow with increasing viscosity. In the event the pump should have the opposite effect, that is, increasing flow with increasing viscosity, similar compensation techniques can still be used but with the use of sharp edge and round edge orifices reversed. In other words, in the case of the fifth orifice the orifice would be a rounded edge orifice and in the case where the bridge orifices are used for compensation they would be sharp edged orifices.

It is also possible to use a combination of both techniques for viscosity compensation of the pump. That is, a fifth orifice, as well as compensation type bridge orifices.

Further, in the case of the bridge orifices either a pair of the orifices could be used having the identical correct compensating flow coefficient, or all four orifices may have identical flow coefficients for compensation.

Measurement of the signal indicative of mass flow, in the apparatus of the present invention, is described in the above referred to prior art patents and is illustrated in FIGS. 2 and 3 hereof.

The flow capacity of the passages 3 can be so proportioned (in cross-sectional area) relative to the volume of cavities 6 that a particular cavity will fill completely with liquid pumped thereunto by the passage 3 during rotation of the impeller from the position wherein the rear wall 8 of a particular cavity has just passed the pump discharge port to the position wherein the cavity is initially opened to the pump discharge port.

I claim:

1. A mass flowmeter adapted to measure the mass flow rate of an effectively incompressible liquid passing there through comprising inlet and outlet conduits having a flow which is to be measured, first and second branch conduits connecting said inlet and outlet conduits, first and second flow restrictors in said first branch conduit, third and fourth flow restrictors in said second branch conduit, pumping means connecting said first and second branch conduits at points between the flow restrictors therein, said pumping means comprising a rotatable impeller for centrifugally pumping said liquid at a volumetric flow rate greater than the flow rate in said inlet and outlet conduits, said first and second restrictors having the same flow characteristics, said third and fourth flow restrictors having the same flow characteristics, the impeller of said pumping means producing an undesirable variation in volumetric flow rate with changes in liquid viscosity, and means for compensating for said undesirable variation comprising at least two of said restrictors dimensioned to have the same flow coefficient but whose flow coefficient changes with viscosity in the direction to compensate for said variation in volumetric flow rate produced by the impeller of said pumping means due to changes in said viscosity.

2. A mass flowmeter adapted to measure the mass flow rate of an effectively incompressible liquid passing there through comprising inlet and outlet conduits having a flow which is to be measured, first and second branch conduits connecting said inlet and outlet conduits, first and second flow restrictors in said first branch conduit, third and fourth flow restrictors in said second branch conduit, pumping means connecting said first and second branch conduits at points between the flow restrictors therein, said pumping means comprising a rotatable impeller for centrifugally pumping said liquid at a volumetric flow rate less than the flow rate in said inlet and outlet conduits, said first and fourth restrictors having the same flow characteristics, said second and third flow restrictors having the same flow characteristics, the impeller of said pumping means producing an undesirable variation in volumetric flow rate with changes in liquid viscosity, and means for compensating for said undesirable variation comprising at least two of said restrictors dimensioned to have the same flow coefficient but whose flow coefficient changes with viscosity in the direction to compensate for said variation in volumetric flow rate produced by the impeller of said pumping means due to changes in said viscosity.

3. A mass flowmeter adapted to measure the mass flow rate of an effectively incompressible liquid passing there through comprising inlet and outlet conduits having a flow which is to be measured, first and second branch conduits connecting said inlet and outlet conduits, first and second flow restrictors in said first branch conduit, third and fourth flow restrictors in said second branch conduit, a constant volumetric pumping means for pumping a given constant volumetric flow rate independently of changes in density of said liquid connecting said first and second branch conduits at points between the flow restrictors therein, said pumping means comprising rotatable impeller for centrifugally pumping liquid at a constant volumetric flow rate greater than the flow rate in said inlet and outlet conduits, said pumping means connecting said branch conduits at points between the flow restrictors therein; and a fifth orifice in the connection between one of said branch lines and the discharge outlet of said pumping means for compensating the volumetric flow rate of said centrifugal pump means for changes in flow due to changes in viscosity of the fluid flowing through the flowmeter.

4. A mass flowmeter adapted to measure the mass flow rate of an effectively incompressible liquid passing there through comprising inlet and outlet conduits having a flow which is to be measured, first and second branch conduits connecting said inlet and outlet conduits, first and second flow restrictors in said first branch conduit, third and fourth flow restrictors in said second branch conduit, a constant volumetric pumping means for pumping a given constant volumetric flow rate independently of changes in density of said liquid connecting said first and second branch conduits at points between the flow restrictors therein, said pumping means comprising a rotatable impeller for centrifugally pumping said liquid at a constant volumetric flow rate less than the flow rate in said inlet and outlet conduits, said pumping means connecting said branch conduits at points between the flow restrictors therein; and a fifth orifice in the connection between one of said branch lines and the discharge outlet of said pumping means for compensating the volumetric flow rate of said centrifugal pump means for changes in flow due to changes in viscosity of the fluid flowing through the flowmeter.

5. In a mass-rate liquid flowmeter of the recirculation type, the improvement which comprises a centrifugal pump for producing the recirculating liquid flow having a rotatable impeller with at least one radially extending passage connecting a pump inlet positioned adjacent the axis of rotation of the impeller with at least one chamber positioned adjacent the periphery of said impeller, said radially extending passage and said chamber coacting upon rotation of said impeller to produce a pressure rise in the recirculating liquid which is so high in relation to the rate of flow of the recirculating liquid over a selected range of operating pressures that the volumetric flow rate of said recirculating liquid is substantially constant.

6. Apparatus for producing a signal which is a linear function of a mass-rate liquid flow to be measured, comprising, a pump having a substantially constant volumetric flow output over the pressure rise range at which the pump is to be operated, said pump comprising a rotatable impeller provided with radial flow passages extending from an inlet adjacent the axis of rotation of said impeller respectively to a plurality of cavities spaced around the periphery of said impeller, and a casing surrounding said impeller provided with at least one outlet port for receiving liquid discharged under pressure from said cavities, means for adding and subtracting the liquid flow produced by said pump to and from the flow of the liquid to be measured, creating pressure differentials in said added flows and in said subtracted flows, and producing a signal from said pressure differentials which is a linear function of the mass-flow rate of the liquid to be measured.

* * * * *